United States Patent
O'Donnell et al.

(10) Patent No.: US 11,685,412 B2
(45) Date of Patent: Jun. 27, 2023

(54) OVERRIDE OF AUTONOMOUS FUNCTIONS OF A MACHINE

(71) Applicant: Caterpillar Paving Products Inc., Brooklyn Park, MN (US)

(72) Inventors: Timothy O'Donnell, Long Lake, MN (US); Nicholas A Oetken, Brooklyn Park, MN (US); Kyle Hendricks, Saint Francis, MN (US); Robert Jason McGee, Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 161 days.

(21) Appl. No.: 16/810,508

(22) Filed: Mar. 5, 2020

(65) Prior Publication Data

US 2021/0276596 A1    Sep. 9, 2021

(51) Int. Cl.
*B60W 60/00*    (2020.01)
*E02F 3/96*    (2006.01)
*E02F 9/20*    (2006.01)

(52) U.S. Cl.
CPC ......... *B60W 60/0055* (2020.02); *E02F 3/967* (2013.01); *E02F 9/2045* (2013.01); *B60W 2300/17* (2013.01)

(58) Field of Classification Search
CPC ......... B60W 60/0055; B60W 2300/17; B60W 60/0054; B60W 60/007; B60W 60/00–007; E02F 3/967; E02F 9/2045; E02F 9/20457; E02F 3/00–968; G05D 1/0088; G05D 1/0061; G05D 1/0223; G05D 1/0229; G05D 1/0011; G05D 1/00–1/12; E01C 19/004; E01C 19/23; E01C 19/29; E01C 19/00–528

USPC ........................................................... 701/50
See application file for complete search history.

(56) References Cited

U.S. PATENT DOCUMENTS

| | | | |
|---|---|---|---|
| 6,286,606 B1 * | 9/2001 | Krieg | E02F 3/764 |
| | | | 172/4.5 |
| 9,267,245 B1 * | 2/2016 | Braun | B62D 12/00 |
| 2008/0173740 A1 * | 7/2008 | Parker | E01C 23/088 |
| | | | 475/23 |
| 2010/0087992 A1 * | 4/2010 | Glee | E01C 19/288 |
| | | | 701/50 |
| 2010/0254793 A1 * | 10/2010 | Trifunovic | E02F 3/432 |
| | | | 414/700 |
| 2013/0197767 A1 * | 8/2013 | Lenz | A01B 79/005 |
| | | | 701/50 |
| 2013/0261902 A1 * | 10/2013 | Zhdanov | G05G 9/047 |
| | | | 701/50 |
| 2014/0019018 A1 * | 1/2014 | Baumgarten | A01D 41/127 |
| | | | 701/50 |
| 2014/0133906 A1 * | 5/2014 | Frelich | E01C 19/48 |
| | | | 404/75 |

(Continued)

*Primary Examiner* — Fadey S. Jabr
*Assistant Examiner* — Mohamed Abdo Algehaim
(74) *Attorney, Agent, or Firm* — Harrity & Harrity, LLP

(57) ABSTRACT

An autonomous machine control system is disclosed. The autonomous machine control system may include a controller configured to: cause an initiation of an autonomous mode of a machine, the autonomous mode providing automatic control of a propulsion operation, a steering operation, and a work operation of the machine; determine that automatic control of the work operation is to be disabled in the autonomous mode of the machine; and cause automatic control of the work operation to be disabled in the autonomous mode of the machine, while automatic control of the propulsion operation and the steering operation is enabled in the autonomous mode of the machine.

20 Claims, 3 Drawing Sheets

(56) References Cited

U.S. PATENT DOCUMENTS

| | | | |
|---|---|---|---|
| 2014/0222247 A1* | 8/2014 | Friend | E01C 19/004 701/2 |
| 2014/0257646 A1* | 9/2014 | Ishibashi | E02F 3/7613 701/50 |
| 2015/0198936 A1* | 7/2015 | McGee | E02F 9/20 700/40 |
| 2015/0259881 A1* | 9/2015 | Sharma | B62D 12/00 701/50 |
| 2016/0060819 A1* | 3/2016 | Oetken | E01C 19/23 404/72 |
| 2016/0208914 A1* | 7/2016 | Kondou | F16H 61/18 |
| 2016/0282878 A1* | 9/2016 | Stratton | G05D 1/0219 |
| 2017/0009426 A1* | 1/2017 | Wei | E02F 9/2054 |
| 2017/0314215 A1* | 11/2017 | Graham | E01C 19/48 |
| 2018/0024549 A1* | 1/2018 | Hurd | G05D 1/0016 701/2 |
| 2018/0118256 A1* | 5/2018 | Ge | B62D 12/00 |
| 2018/0209119 A1* | 7/2018 | Horstman | E02F 9/202 |
| 2018/0274207 A1* | 9/2018 | Yokoo | E02F 3/437 |
| 2018/0321682 A1* | 11/2018 | Matsumoto | G01S 19/14 |
| 2020/0047337 A1* | 2/2020 | Williams | B25J 9/163 |
| 2020/0114909 A1* | 4/2020 | Shelton | B60W 30/09 |
| 2020/0285228 A1* | 9/2020 | Rulseh | G05D 1/0027 |
| 2021/0037691 A1* | 2/2021 | Horsch | A01B 51/026 |
| 2021/0240193 A1* | 8/2021 | Endo | G05D 1/0223 |
| 2021/0270013 A1* | 9/2021 | Nishi | E02F 9/264 |
| 2022/0064876 A1* | 3/2022 | Fujimoto | E01C 19/286 |
| 2022/0136184 A1* | 5/2022 | Mühlhausen | E01C 19/288 404/122 |
| 2022/0162812 A1* | 5/2022 | Cserw | B60L 58/12 |

* cited by examiner

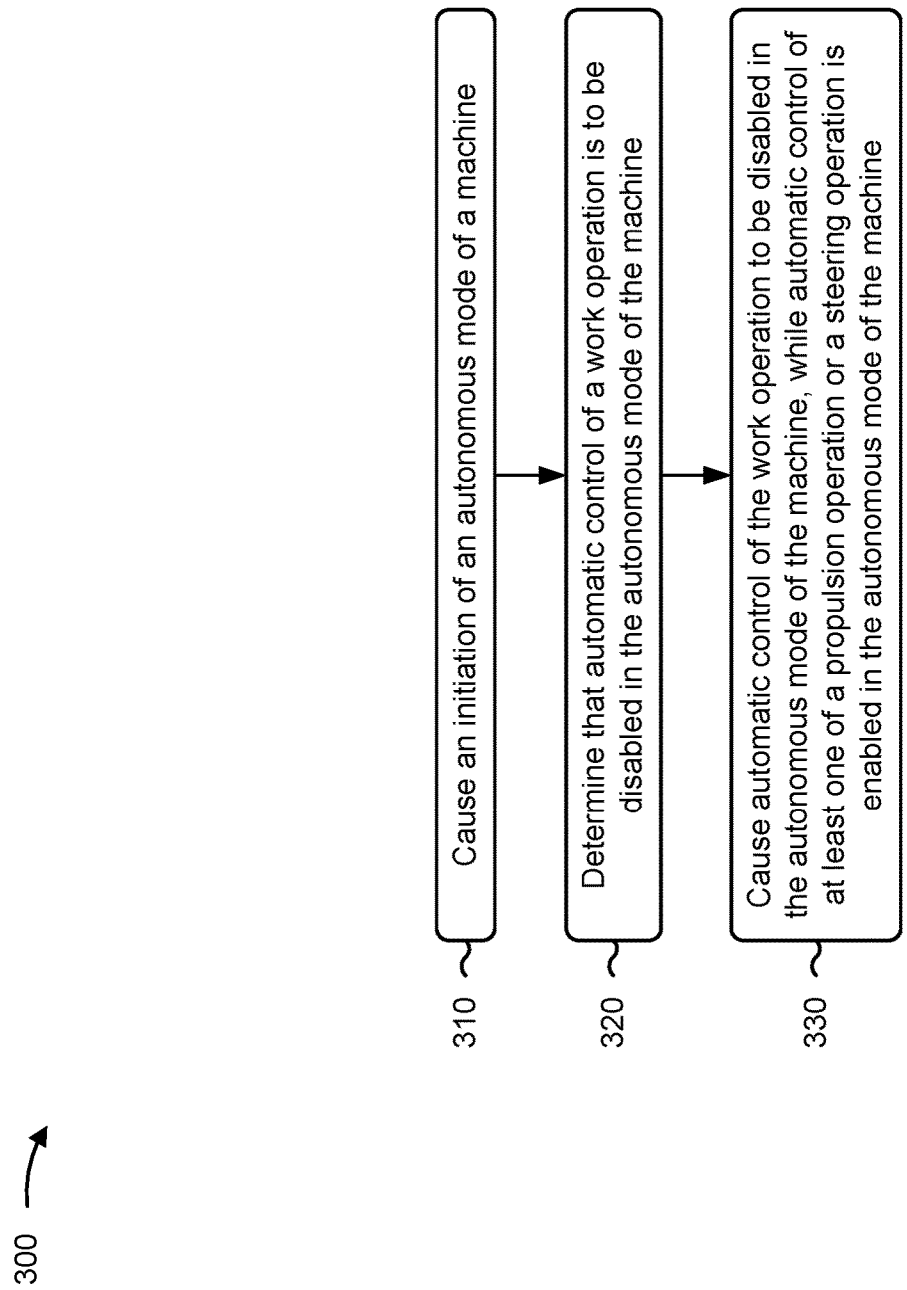

OVERRIDE OF AUTONOMOUS FUNCTIONS OF A MACHINE

TECHNICAL FIELD

The present disclosure relates generally to a machine and, for example, to override of autonomous functions of the machine.

BACKGROUND

Compaction of a surface material, such as soil or asphalt, can improve strength and stability of the surface to a particular degree required for a construction operation. Typically, compaction is performed by a mobile compactor machine. One type of compactor machine is an autonomous compactor machine, which performs compaction tasks over a defined area using a set of defined compaction settings without control by a human operator. This can enhance the productivity of the machine, and reduce the human resources required for controlling operation of a worksite. However, in some cases, the defined area for compaction may include various surface conditions, such that autonomous operation according to the set of defined compaction settings is unsuitable. For example, over-compaction or under-compaction of an area of surface material may affect a strength of the surface material, a stability of the surface material, a usability of the surface material for further construction operations, and/or the like.

The autonomous machine control system of the present disclosure solves one or more of the problems set forth above and/or other problems in the art.

SUMMARY

According to some implementations, a method may include causing an initiation of an autonomous mode of a machine, the autonomous mode providing automatic control of at least one of a propulsion operation, a steering operation, or a work operation of the machine; determining that automatic control of the work operation is to be disabled in the autonomous mode of the machine; and causing automatic control of the work operation to be disabled in the autonomous mode of the machine, while automatic control of at least one of the propulsion operation or the steering operation is enabled in the autonomous mode of the machine.

According to some implementations, an autonomous machine control system may include a controller configured to: cause an initiation of an autonomous mode of a machine, the autonomous mode providing automatic control of at least one of a propulsion operation, a steering operation, or a work operation of the machine; determine that automatic control of the work operation is to be disabled in the autonomous mode of the machine; and cause automatic control of the work operation to be disabled in the autonomous mode of the machine, while automatic control of at least one of the propulsion operation or the steering operation is enabled in the autonomous mode of the machine.

According to some implementations, a machine may include a work system, a propulsion system, a steering system, and a controller configured to: cause initiation of an autonomous mode of the machine, the autonomous mode providing automatic control of at least one of the propulsion system, the steering system, or the work system; determine that automatic control of the work system is to be disabled in the autonomous mode of the machine; and cause automatic control of the work system to be disabled in the autonomous mode of the machine, while automatic control of at least one of the propulsion system or the steering system is enabled in the autonomous mode of the machine.

BRIEF DESCRIPTION OF THE DRAWINGS

FIG. 3 is a flow chart of an example process for override of autonomous functions of a machine.

DETAILED DESCRIPTION

This disclosure relates to an autonomous machine control system. The autonomous machine control system has universal applicability to any machine that can operate in an autonomous mode, such a compactor machine, a paving machine, a cold planer, a grading machine, or the like.

Figure 1:
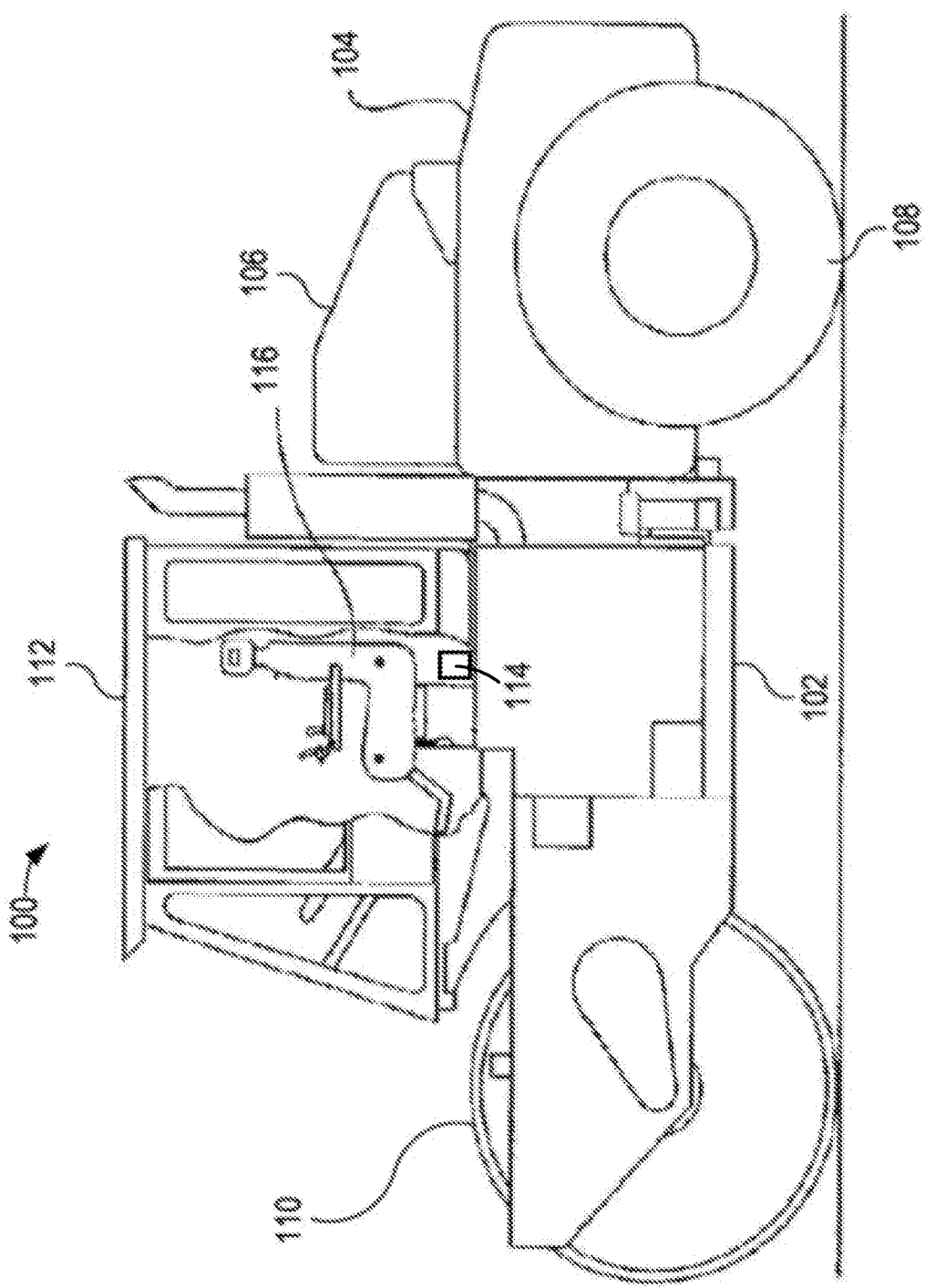
FIG. 1 is diagram of an example machine described herein.

FIG. 1 is a diagram of an example machine 100 described herein. The machine 100 may be, for example, a vibratory drum compactor machine, which may be used to compact various materials, such as soil, asphalt, and/or the like. As shown in FIG. 1, the machine 100 includes a frame 102 that is attached to, and supports, a body 104. The frame 102 may include multiple portions and/or separate frames coupled to one another. For example, the frame 102 may include multiple coupled frames configured to articulate relative to one another.

The machine 100 also includes a power generator 106, which is configured to generate power to propel the machine 100. The power generator 106 includes one or more power generation devices, such as an internal combustion engine (e.g., a gasoline and/or a diesel internal combustion engine), an electric motor, and/or the like.

The power generator 106 is operatively coupled to wheels 108. Although not depicted, the machine 100 includes brakes associated with the wheels 108. In some implementations, the machine 100 may employ other ground engaging members in addition to, or instead of, the wheels 108. For example, the machine 100 may include tracks. The power generator 106 also may be operatively coupled to one or more drive train components, such as a transmission configured to transmit the power generated by the power generator 106 to the wheels 108. In addition, the power generator 106 may provide power for various operational elements of the machine 100, such as one or more implements attached to the machine 100.

The machine 100 includes a drum 110. The drum 110 is coupled to the frame 102 and is configured to rotate relative to the frame 102 about an axis perpendicular to a travel direction of the machine 100. The drum 110 provides compaction force to process materials, such as asphalt, soil, and/or the like. For example, the drum 110 provides static compaction forces due to a weight of the drum 110. In addition, the drum 110 includes one or more mechanisms configured to vibrate the drum and thereby provide dynamic compaction forces. The one or more mechanisms may be surrounded by the drum 110 (e.g., internal to the drum 110), and may include a weight that is rotated (e.g., about the axis perpendicular to the travel direction) to provide vibration of the drum 110. In some configurations, the machine 100 may include a second drum, as described above, in place of the wheels 108.

In some implementations, the machine 100 is a grading machine (not shown). In this example, the machine 100 does not include the drum 110, and may include a blade, a drawbar-circle-moldboard assembly, and/or the like. Alternatively, the machine 100 may include a blade, a drawbar-circle-moldboard assembly, and/or the like, in addition to the drum 110.

The machine 100 includes an operator station 112. A human operator of the machine 100 may occupy the operator station 112 to manually control various functions and motions of the machine 100 by, for example, a steering mechanism, one or more control inputs (e.g., a speed throttle, an implement control lever, and/or the like), a console, and/or other user inputs.

In addition, the machine 100 is configured to operate in an autonomous mode (e.g., using a global positioning system (GPS), a light detection and ranging (LIDAR) system, and/or the like). A machine configured to operate in an autonomous mode may be referred to as an autonomous machine (although particular operations of the machine may be manually controlled). In the autonomous mode, one or more functions of the machine 100 may be automatically controlled by a controller 114 (e.g., an electronic control module (ECM)) of the machine 100, rather than manually controlled by a human operator. As shown in FIG. 1, the controller 114 is located behind a seat 116 of the machine 100, however, the controller 114 may be located at other locations of the machine 100.

In the autonomous mode, the controller 114 may provide automatic control of a propulsion operation, a steering operation, and/or a work operation of the machine 100 (e.g., in connection with one or more sensors of the machine 100). In this case, a human operator may occupy the operator station 112 to observe operation of the machine 100 and/or to override the autonomous mode and provide manual control of the machine 100 as needed. In some cases, a human operator may not occupy the operator station 112, and may remotely observe operation of the machine 100 and/or remotely override the autonomous mode to provide manual control, such as via a remote control device.

The controller 114 may include one or more memories and/or one or more processors that implement operations associated with the autonomous mode of the machine 100, as described in connection with FIG. 2. For example, the controller 114 may be configured to cause an initiation of an autonomous mode of the machine 100, determine that automatic control of a work operation is to be disabled in the autonomous mode, cause automatic control of the work operation to be disabled in the autonomous mode of the machine, and/or the like.

As indicated above, FIG. 1 is provided as an example. Other examples may differ from what was described in connection with FIG. 1.

Figure 2:
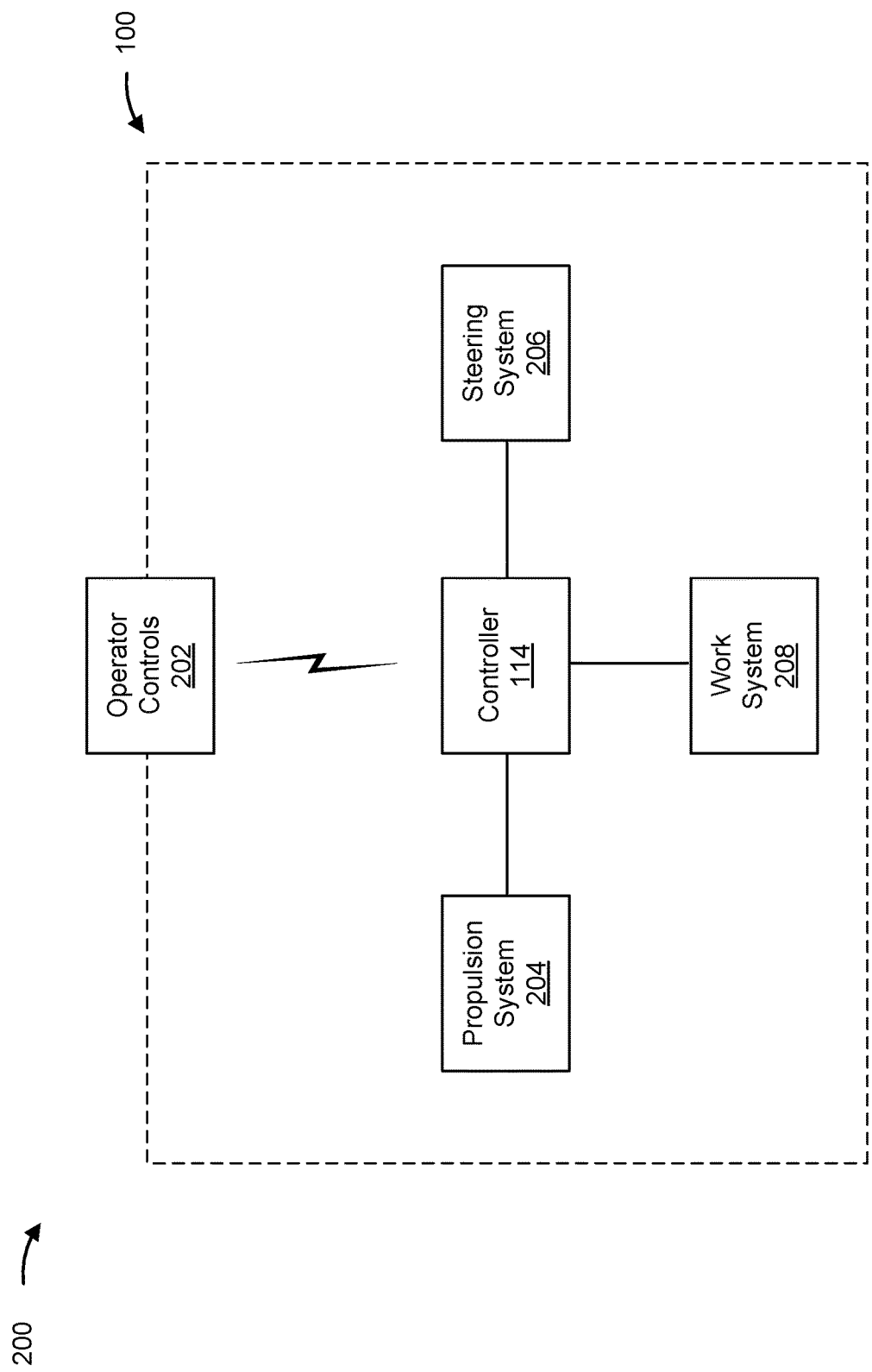
FIG. 2 is diagram of an example autonomous machine control system described herein.

FIG. 2 is a diagram of an example autonomous machine control system 200 described herein. As shown in FIG. 2, the machine 100 includes the autonomous machine control system 200. The autonomous machine control system 200 includes the controller 114, operator controls 202, a propulsion system 204, a steering system 206, and a work system 208.

The operator controls 202 include one or more input devices configured to receive an operator command from a human operator of the machine 100, and provide information relating to the operator command to the controller 114. For example, the operator controls 202 may be one or more control inputs (e.g., one or more buttons, joysticks, levers, and/or the like), one or more consoles, and/or other user inputs, as described in connection with FIG. 1, that are included in the machine 100 and have a wired connection to the controller 114. As another example, the operator controls 202 may be one or more remote control devices, and/or other user inputs, as described in connection with FIG. 1, that are remotely located from the machine 100 and have a wireless connection to the controller 114.

A human operator of the machine 100 (e.g., a human operator that is occupying the operator station 112 or that is remotely located) may use the operator controls 202 to configure parameters for an autonomous mode of the machine 100. For example, the parameters may include an area (e.g., a geographical area, one or more geographical boundaries, and/or the like) in which the machine 100 is to perform a work operation (e.g., a compaction operation, a grading operation, and/or the like), a quantity of passes that the machine 100 is to perform of the area, an amount of overlap of lanes of the area, a set of work settings for the work operation (which may be the same or different for successive passes of the area), and/or the like. The controller 114 may store, or cause another device to store, the parameters for the autonomous mode.

The work operation may be a vibratory compaction operation (e.g., in which a vibratory mechanism of the drum 110 is activated to provide vibration of the drum 110, as described above). In this case, the set of work settings may define a frequency of the vibration, an amplitude of the vibration, and/or the like. The set of work settings also may enable or disable an automatic vibration control that activates vibration of the drum 110 when the machine 100 is moving, and deactivates vibration of the drum 110 when the machine 100 is stationary. Additionally, or alternatively, the work operation may be a grading operation. In this case, the set of work settings may define a height of a blade used for grading, an angle of the blade, and/or the like. Additionally, or alternatively, the work operation may be another operation that uses an implement of the machine 100, and the set of work settings may define a position of the implement, a functionality of the implement, and/or the like.

A human operator of the machine 100 may use the operator controls 202 to command initiation of an autonomous mode of the machine 100. In some implementations, the autonomous mode is automatically initiated (e.g., by the controller 114) based on one or more criteria for automatically initiating the autonomous mode. Based on a command (e.g., an operator command) to initiate the autonomous mode (e.g., via the operator controls 202), the controller 114 may cause initiation of the autonomous mode of the machine 100. The autonomous mode operates according to the parameters for the autonomous mode, described above.

The autonomous mode provides automatic control of the propulsion system 204, the steering system 206, and/or the work system 208 (e.g., when automatic control of the propulsion system 204, the steering system 206, and/or the work system 208 is enabled in the autonomous mode). That is, in the autonomous mode, the controller 114 provides control (e.g., according to the parameters for the autonomous mode) of the propulsion system 204, the steering system 206, and/or the work system 208, rather than those systems being manually controlled by a human operator.

The propulsion system 204 includes systems and mechanisms of the machine 100 that perform operations relating to the propulsion (e.g., forward or reverse movement of the machine 100) and braking of the machine 100. In other words, the propulsion system 204 provides a propulsion operation of the machine 100. The propulsion system 204 may include the wheels 108, brakes associated with the wheels 108, a transmission, other drive train components, and/or the like. Accordingly, in the autonomous mode, the controller 114 provides automatic control of forward movement, reverse movement, speed, acceleration, braking, and/or the like, of the machine 100.

The steering system 206 includes systems and mechanisms of the machine 100 that perform operations relating to the steering and directional movement of the machine 100. In other words, the steering system 206 provides a steering operation of the machine 100. The steering system 206 may include a steering mechanism, the wheels 108, and/or the like. Accordingly, in the autonomous mode, the controller 114 provides automatic control of turning, drift correction, and/or the like, of the machine 100.

The work system 208 (e.g., a vibratory compaction system, a grading system, and/or the like) includes systems and mechanisms of the machine 100 that perform operations relating to a work operation of the machine 100. In other words, the work system 208 provides a work operation of the machine 100. The work operation may be a compaction operation, a grading operation, and/or the like.

The work system 208 (e.g., a vibratory compaction system) may include the drum 110, a vibratory mechanism of the drum 110, and/or the like. Accordingly, in the autonomous mode, the controller 114 provides automatic control of vibration of the drum 110, and/or the like. For example, the controller 114 may maintain vibration of the drum 110 in accordance with the set of parameters for the autonomous mode, enable or disable vibration of the drum 110 based on whether the machine 100 is moving or stationary (e.g., according to an automatic vibration control), and/or the like.

The work system 208 (e.g., a grading system) may include a blade, a blade assembly, a drawbar-circle-moldboard assembly, one or more hydraulic cylinders (e.g., for positioning a blade), and/or the like. Accordingly, in the autonomous mode, the controller 114 provides automatic control of a height of the blade, an angle of the blade, whether the blade is disengaged from a surface material, and/or the like. For example, the controller 114 may maintain a height and/or an angle of the blade in accordance with the set of parameters for the autonomous mode.

The work system 208 may include another implement of the machine 100. Accordingly, in the autonomous mode, the controller 114 provides automatic control of a position of the implement, a functionality of the implement, and/or the like.

While the machine 100 is in the autonomous mode, a human operator of the machine 100 may use the operator controls 202 to command an override of the work operation of the autonomous mode. That is, the human operator may command that automatic control of the work operation is to be disabled. In some implementations, the work operation of the autonomous mode may be automatically overridden (e.g., by the controller 114) based on one or more criteria for automatically overriding the work operation of the autonomous mode. For example, a criterium may be whether a change in a property (e.g., hardness, density, type, moisture, and/or the like) of a surface material is detected (e.g., using a sensor, a camera, and/or the like), whether the machine 100 is within a threshold distance of a building or other vibration-sensitive location, and/or the like.

Based on a command (e.g., an operator command) to override the work operation of the autonomous mode (e.g., via the operator controls 202), the controller 114 may determine that automatic control of the work operation is to be disabled and cause automatic control of the work operation to be disabled. For example, the controller 114 may no longer provide automatic control of the work operation.

Alternatively, the controller 114 may determine to disregard the command to override the work operation and determine that automatic control of the work operation is not to be disabled (e.g., based on one or more properties of the surface material, which may be estimated using one or more sensors, camera, and/or the like). The work operation of the work system 208 is manually controlled (e.g., by a human operator) in the autonomous mode when automatic control of the work operation is disabled.

When the work operation of the autonomous mode is disabled, at least one of the propulsion operation or the steering operation of the autonomous mode remains enabled. In other words, disabling automatic control of the work operation does not disable the autonomous mode of the machine 100. Accordingly, automatic control of the propulsion operation and/or the steering operation continues in the autonomous mode while the work operation is manually controlled.

Manual control of the work operation permits a human operator to control the work operation, for example, via the operator controls 202. For example, manual control of a compaction operation permits the human operator to disable the compaction operation (e.g., disable a vibratory component of the compaction operation), enable the compaction operation (e.g., enable a vibratory component of the compaction operation), adjust an amplitude of a vibration associated with the compaction operation, adjust a frequency of a vibration associated with the compaction operation, disable an automatic vibration control of the compaction operation, and/or the like. As another example, manual control of a grading operation permits the human operator to disengage a blade from a surface material, engage the blade with the surface material, adjust a height of the blade, adjust an angle of the blade, and/or the like. As a further example, manual control of another operation involving an implement of the machine 100 permits the human operator to position the implement, enable or disable a functionality of the implement, and/or the like.

In some examples, one or more work settings may continue to operate under automatic control (e.g., according to the parameters for the autonomous mode) while one or more other work settings are manually controlled. For example, a frequency of a vibration may operate under automatic control while the amplitude of the vibration is manually controlled.

In some implementations, manual control of the work operation is initiated using a set of work settings that were last used during a previous manual control of the work operation. For example, during the previous manual control of the work operation, the controller 114 may store, or cause another device to store, the set of work settings. Accordingly, the controller 114 may obtain the stored set of work settings for use in initiating the manual control of the work operation. The stored set of work settings may indicate whether the work operation is to be enabled or disabled, a particular vibration amplitude that is to be used, a particular vibration frequency that is to be used, whether the work operation is to be disengaged, a particular grading depth that is to be used, a particular grading angle that is to be used, a particular implement position that is to be used, and/or the like.

The controller 114 may store information relating to the manual control of the work operation. For example, the controller 114 may store information relating to a location (e.g., latitude and longitude coordinates) of the machine 100 during an interval when automatic control of the work operation is disabled. The information relating to the location of the machine 100 may be stored in association with information relating to the set of work settings used during manual control of the work operation (e.g., for forensic analysis in a case when the area processed by the machine 100 fails or experiences other problems). Based on the stored information, the controller 114 may estimate one or more properties of the surface material (e.g., compacted and/or graded surface material), estimate a suitability of the surface material for additional construction operations, and/or the like, and generate a report indicating such estimates.

After an interval during which automatic control of the work operation is disabled, a human operator of the machine 100 may use the operator controls 202 to command a return to (e.g., a re-initiation of) automatic control of the work operation in the autonomous mode. That is, the human operator may command that automatic control of the work operation is to be enabled. In some implementations, the work operation of the autonomous mode may be automatically enabled (e.g., by the controller 114) based on one or more criteria for automatically enabling the work operation of the autonomous mode. For example, one criterium may be whether the interval, during which automatic control of the work operation is disabled, satisfies a threshold amount of time.

Based on a command (e.g., an operator command) to re-initiate the autonomous mode (e.g., via the operator controls 202), the controller 114 may determine that automatic control of the work operation is to be enabled and cause automatic control of the work operation to be enabled. Automatic control of the work operation may be enabled using a set of work settings that were last used during a previous automatic control of the work operation (e.g., prior to disabling automatic control of the work operation). For example, the set of work settings may be those that were configured by the human operator prior to initiation of the autonomous mode, as described above.

As indicated above, FIG. 2 is provided as an example. Other examples may differ from what was described in connection with FIG. 2.

FIG. 3 is a flowchart of an example process 300 for override of autonomous functions of a machine. In some implementations, one or more process blocks of FIG. 3 may be performed by a controller (e.g., controller 114). Additionally, or alternatively, one or more process blocks of FIG. 3 may be performed by another device or a group of devices separate from or including the controller, such as another device or component that is internal or external to the machine 100.

As shown in FIG. 3, process 300 may include causing an initiation of an autonomous mode of a machine (block 310). For example, the controller (e.g., using a processor, a memory, a storage component, an input component, an output component, a communication interface, and/or the like) may cause an initiation of an autonomous mode of a machine, as described above. The autonomous mode provides automatic control of a propulsion operation, a steering operation, and a work operation of the machine. The work operation may be a vibratory compaction operation or a grading operation.

As further shown in FIG. 3, process 300 may include determining that automatic control of a work operation is to be disabled in the autonomous mode of the machine (block 320). For example, the controller (e.g., using a processor, and/or the like) may determine that automatic control of the work operation is to be disabled in the autonomous mode of the machine, as described above. Determining that automatic control of the work operation is to be disabled may be based on an operator command to override automatic control of the work operation.

As further shown in FIG. 3, process 300 may include causing automatic control of the work operation to be disabled in the autonomous mode of the machine, while automatic control of at least one of a propulsion operation or a steering operation is enabled in the autonomous mode of the machine (block 330). For example, the controller (e.g., using a processor, a memory, a storage component, an input component, an output component, a communication interface, and/or the like) may cause automatic control of the work operation to be disabled in the autonomous mode of the machine, as described above.

The work operation is manually controlled in the autonomous mode of the machine when automatic control of the work operation is disabled. Manual control of the work operation includes one or more of disabling the work operation, enabling the work operation, disengaging an implement (e.g., blade) associated with the work operation, engaging an implement associated with the work operation, adjusting an amplitude of a vibration associated with the work operation, adjusting a frequency of a vibration associated with the work operation, or adjusting a position of an implement associated with the work operation. Manual control of the work operation may be initiated using a set of work settings last used during a previous manual control of the work system.

Process 300 may include determining, after an interval during which automatic control of the work operation is disabled, that automatic control of the work operation is to be enabled in the autonomous mode of the machine, and causing automatic control of the work operation to be enabled in the autonomous mode of the machine. Determining that automatic control of the work operation is to be enabled may be based on an operator command to enable automatic control of the work operation. Automatic control of the work operation may be enabled in the autonomous mode of the machine using a set of work settings used for automatic control of the work operation prior to disabling automatic control of the work operation (e.g., a set of work settings configured by an operator of the machine prior to the initiation of the autonomous mode).

Process 300 may include causing storage of information relating to a location in which automatic control of the work operation is disabled in the autonomous mode of the machine. The information relating to the location is stored in association with information relating to a set of work settings used when automatic control of the work operation is disabled in the autonomous mode of the machine.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed autonomous machine control system 200 may be used with any machine that can operate in an autonomous mode. For example, the autonomous machine control system 200 may be used with any machine 100 where manual override of automatic control of a work operation is desired. In this way, a human operator of the machine 100 may manually control a work operation (e.g., a compaction operation, a grading operation, and/or the like), while other operations, such as a propulsion operation or a steering operation, remain automatically controlled. This permits manual control of the work operation without disabling an autonomous mode of the machine 100. Manual control of the work operation may be desired when an area being processed by the machine 100 includes surface material of varying properties (e.g., mechanical properties) that affect processing of the area.

Moreover, the disclosed autonomous machine control system 200 may be used to store information relating to a manual override of automatic control of a work operation. For example, the information may indicate a location of an area where the override occurred, and one or more work settings associated with the override. This may enable forensic analysis of the work operation in the event that the area where the override occurred experiences problems. Additionally, the information may enable analysis of the area where the override occurred in order to identify potential surface weakness, identify areas in need of additional processing, and/or the like.

What is claimed is:

1. A method, comprising:
    causing an initiation of an autonomous mode of a machine,
        the autonomous mode providing automatic control of a vibration of a drum of the machine and at least one of automatic control of a propulsion operation or automatic control of a steering operation;
    determining that the automatic control, of the vibration of the drum, is to be disabled; and
    initiating, based on determining that the automatic control, of the vibration of the drum, is to be disabled, a manual control of the vibration of the drum while at least one of the automatic control of the propulsion operation or the automatic control of the steering operation remains enabled.

2. The method of claim 1, wherein the manual control of the vibration of the drum includes one or more of:
    disabling the vibration of the drum,
    enabling the vibration of the drum,
    disengaging an implement associated with the vibration of the drum,
    engaging the implement associated with the vibration of the drum,
    adjusting an amplitude of the vibration of the drum,
    adjusting a frequency of the vibration of the drum, or
    adjusting a position of the implement associated with the vibration of the drum.

3. The method of claim 1, wherein determining that the automatic control, of the vibration of the drum, is to be disabled comprises:
    determining that the automatic control, of the vibration of the drum, is to be disabled based on an operator command to override the automatic control of the vibration of the drum.

4. The method of claim 1, further comprising:
    determining, after an interval during which the automatic control of the vibration of the drum is disabled, that the automatic control of the vibration of the drum is to be enabled in the autonomous mode of the machine; and
    causing the automatic control of the vibration of the drum to be enabled in the autonomous mode of the machine.

5. The method of claim 1, further comprising:
    determining that the automatic control, of the vibration of the drum, is to be enabled based on an operator command to enable the automatic control of the vibration of the drum.

6. The method of claim 1, further comprising:
    causing the automatic control, of the vibration of the drum, to be enabled using a set of work settings used for the automatic control of the vibration of the drum prior to initiating the manual control of the vibration of the drum.

7. The method of claim 6, wherein the set of work settings are configured by an operator of the machine prior to the initiation of the autonomous mode.

8. The method of claim 1, wherein determining that the automatic control, of the vibration of the drum, is to be disabled comprises:
    determining that the automatic control of the vibration of the drum is to be disabled based on one or more criteria for automatically overriding the automatic control of the vibration of the drum.

9. The method of claim 8, wherein the one or more criteria are associated with one more of:
    whether a change in a property of a surface material is detected, or
    whether the machine is within a threshold distance of a building or other vibration-sensitive location.

10. An autonomous machine control system, comprising:
    a controller configured to:
        cause an initiation of an autonomous mode of a machine,
            the autonomous mode providing automatic control of a vibration of a drum of the machine and at least one of automatic control of a propulsion operation or automatic control of a steering operation;
        determine that the automatic control, of the vibration of the drum, is to be disabled; and
        cause the automatic control, of the vibration of the drum, to be disabled while the vibration of the drum remains enabled and at least one of the automatic control of the propulsion operation or the automatic control of the steering operation remains enabled based on determining that the automatic control, of the vibration of the drum, is to be disabled.

11. The autonomous machine control system of claim 10, wherein the vibration of the drum is manually controlled in the autonomous mode of the machine when the automatic control of the vibration of the drum is disabled.

12. The autonomous machine control system of claim 10, wherein, when causing the automatic control, of the vibration of the drum, to be disabled, the controller is configured to:
    initiate a manual control of the vibration of the drum, and
    wherein the manual control of the vibration of the drum includes one or more of:
        disabling the vibration of the drum,
        enabling the vibration of the drum,
        disengaging an implement associated with the vibration of the drum,
        engaging the implement associated with the vibration of the drum,
        adjusting an amplitude of the vibration of the drum,
        adjusting a frequency of the vibration of the drum, or
        adjusting a position of the implement associated with the vibration of the drum.

13. The autonomous machine control system of claim 10, wherein the controller is further configured to:

cause storage of information relating to a location in which the automatic control, of the vibration of the drum, is disabled in the autonomous mode of the machine.

14. The autonomous machine control system of claim 13, wherein the information relating to the location is stored in association with information relating to a set of work settings used when the automatic control, of the vibration of the drum, is disabled in the autonomous mode of the machine.

15. The autonomous machine control system of claim 10, wherein, to determine that the automatic control, of the vibration of the drum, is to be disabled, the controller is configured to:
  determine that the automatic control of the vibration of the drum is to be disabled based on a change in a property of a surface associated with the machine.

16. A machine, comprising:
  a drum;
  a propulsion system;
  a steering system; and
  a controller configured to:
    cause an initiation of an autonomous mode of the machine,
      the autonomous mode providing automatic control of a vibration of the drum and at least one of automatic control of the propulsion system or automatic control of the steering system;
    determine that the automatic control, of the vibration of the drum, is to be disabled; and
    initiate, based on determining that the automatic control, of the vibration of the drum, is to be disabled, a manual control of the vibration of the drum while at least one of the automatic control of the propulsion system or the automatic control of the steering system remains enabled.

17. The machine of claim 16, wherein the manual control of the vibration of the drum includes one or more of:
  disabling the vibration of the drum,
  enabling the vibration of the drum,
  disengaging an implement associated with the vibration of the drum,
  engaging the implement associated with the vibration of the drum,
  adjusting an amplitude of the vibration of the drum,
  adjusting a frequency of the vibration of the drum, or
  adjusting a position of the implement associated with the vibration of the drum.

18. The machine of claim 16, wherein the manual control of the vibration of the drum is initiated using a set of work settings last used during a previous manual control of the vibration of the drum.

19. The machine of claim 16, wherein the controller is further configured to:
  determine that the automatic control of the vibration of the drum is to be enabled in the autonomous mode of the machine; and
  cause the automatic control of the vibration of the drum to be enabled in the autonomous mode of the machine based on determining that the automatic control of the vibration of the drum is to be enabled in the autonomous mode of the machine.

20. The machine of claim 16, wherein, to determine that the automatic control, of the vibration of the drum, is to be disabled, the controller is configured to:
  determine that the automatic control, of the vibration of the drum, is to be disabled based on whether the machine is within a threshold distance of a building or other vibration-sensitive location.

* * * * *